United States Patent [19]

Savage

[11] 4,043,056

[45] Aug. 23, 1977

[54] MAKE A FACE GAME

[76] Inventor: Jerry D. Savage, 95 Fountain Lane, Apt. No. 3, S. Weymouth, Mass. 02190

[21] Appl. No.: 738,378

[22] Filed: Nov. 2, 1976

[51] Int. Cl.² ............................................. G09B 1/28
[52] U.S. Cl. ......................................... 35/28; 35/75; 273/157 R
[58] Field of Search .................. 35/28, 53, 73, 75, 27; 273/155, 157 R, 130 D; 46/37

[56] References Cited

U.S. PATENT DOCUMENTS

| 845,798 | 5/1907 | Lehr | 35/28 X |
|---|---|---|---|
| 2,022,627 | 11/1935 | Whitney | 35/75 |
| 2,100,421 | 11/1937 | Wupper | 273/130 D |
| 2,948,535 | 8/1960 | Ellman | 273/157 R |

FOREIGN PATENT DOCUMENTS

| 995,270 | 8/1951 | France | 273/157 R |
|---|---|---|---|
| 345,017 | 3/1920 | Germany | 273/155 |
| 8,940 | 5/1901 | United Kingdom | 273/155 |
| 419,311 | 11/1934 | United Kingdom | 273/157 R |

Primary Examiner—Harland S. Skogquist

[57] ABSTRACT

A game for forming a variety of designs such as faces, scenes, etc., having a frame with outer ends and a vertically extending channel therebetween with an upper edge and lower edge and an opening extending transversely therethrough for viewing a design therein. A stand is connected to the frame at the lower end thereof for vertically supporting same, and a set of inserts which when assembled in proper orientation to each other forms a single design thereon is provided. The inserts are of a width to slide horizontally within the channel and between the upper and lower edges thereof and extending beyond the outer ends of the frame when assembled.

2 Claims, 4 Drawing Figures

MAKE A FACE GAME

BACKGROUND OF THE INVENTION

The present invention relates to games, and more particularly to a device in which the user may create a variety of designs.

I have found that a novel game can be provided so as to entertain both young and old by utilizing sets of inserts having different designs thereon and which may be assembled within a frame provided for this purpose. This gives the user the necessary challenge to obtain a configuration from utilizing the proper pieces or inserts.

OBJECTS OF THE INVENTION

An object of the present invention is to provide a game which is amusing, enjoyable, and educational to the user thereof.

Another object of the present invention is to provide a game in which the component portions of a design have to be properly selected and matched together so as to be enjoyable in use and challenging.

Other objects and advantages of the present invention will become apparent as the disclosure proceeds.

SUMMARY OF THE INVENTION

A game for forming a variety of designs such as faces, scenes, etc., having a frame with outer ends and a vertically extending channel therebetween with an upper edge and lower edge and an opening extending transversely therethrough for viewing a design therein. A stand is connected to the frame at the lower end thereof for vertically supporting same, and a set of inserts which when assembled in proper orientation to each other forms a single design thereon is provided. The inserts are of a width to slide horizontally within the channel and between the upper and lower edges thereof and extending beyond the outer ends of the frame when assembled.

Each set of inserts includes an upper insert and a lower insert extending the width of the frame and beyond the outer ends thereof, with a middle insert extending between the upper and lower inserts. A plurality of intermediate inserts extend between the upper and lower inserts in abutting relationship to the middle insert, and coupling means is provided to retain the inserts in assembled relationship with each other.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figure 1:
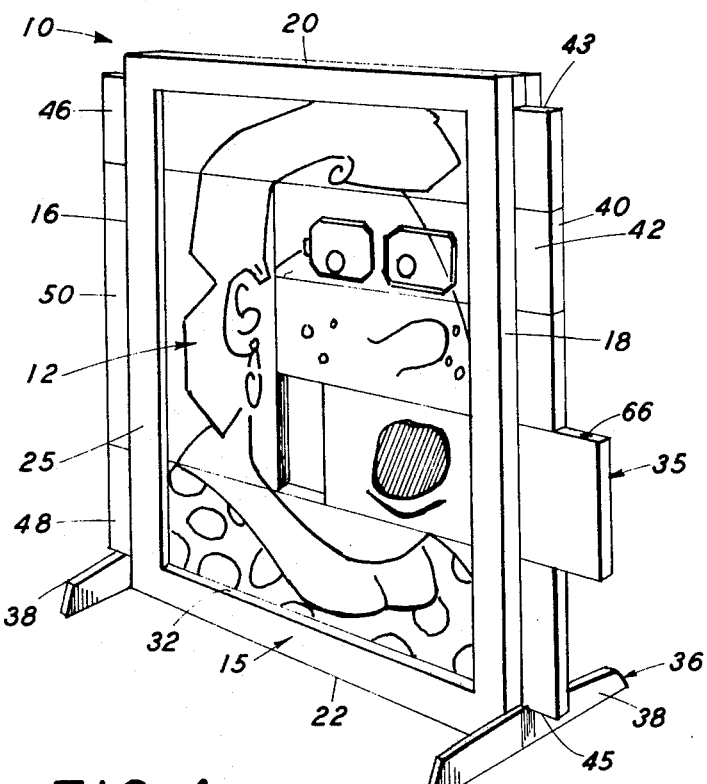
FIG. 1 is a perspective view illustrating the game in accordance with the present invention.
Figure 3:
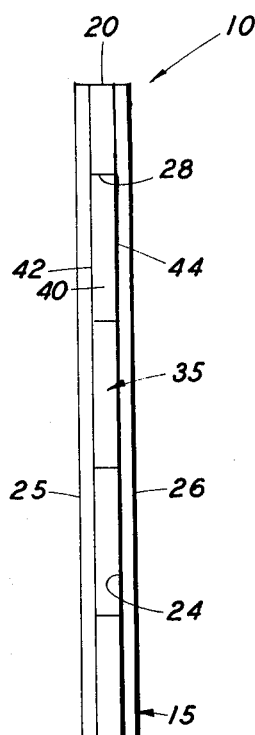
FIG. 3 is a side view of the game.
Figure 4:
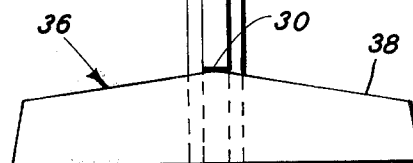
FIG. 4 is a fragmentary bottom view illustrating the frame and stand of the game.

Referring now to the drawings there is illustrated in FIGS. 1–4 a game 10 for forming a variety of designs such as faces, scenes, etc. identified by numeral 12 on one side of the game and numeral 14 on the other side of the game. Although faces have been illustrated for the design, it is appreciated that other scenes, buildings, animals, etc. may be formed. The game includes a frame 15 having outer ends 16 and 18 spaced from each other. The frame 15 is rectangular in shape and also includes a top or upper end 20 and a bottom or lower end 22. A vertically extending channel 24 is formed within the frame between the front 25 and back 26 thereof. The channel 24 has an upper edge 28 and lower edge 30. The frame 15 may be formed from wood or plastic and includes an opening 32 that extends transversely through the front 25 and back 26.

In this manner the frame 15 with the opening 32 therein is adapted to display and retain a variety of inserts that are provided in sets 35. To facilitate the display of each set of inserts, a stand 36 is connected to the frame at the bottom or lower end 22 for vertically supporting same. The stand 36 may include a pair of legs 38 the bottom of which extends in a horizontal plane for supporting the frame 15 during use thereof. By each leg 38 extending transversely to the frame 15 ample support is provided.

Figure 2:
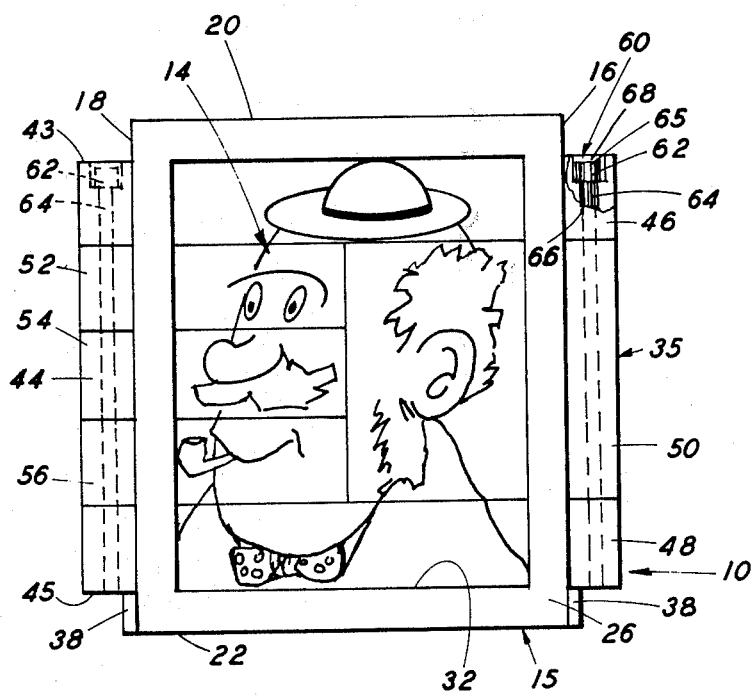
FIG. 2 is a rear plan view illustrating that each side of the inserts may contain a design thereon.

The game may include a number of sets 35 consisting of different inserts or pieces 40 which when assembled in proper orientation to each other forms a single design thereon. The inserts 40 have a front 42 and rear 44 that are of a width designed to extend within the channel 24 so as to slide therein and be removed therein. Further each set 35 when assembled has an upper edge 43 and lower edge 45 extending between the upper edge 28 and lower edge 30 of channel 24. In addition the set 35 is wider than the outer end 16 and 18 of the frame 15 so as to extend there beyond. Each set of insets 35 may include an upper insert 46 and a lower insert 48 extending the width of the frame 15 and beyond the outer ends 16 and 18. A middle insert 50 extends between the upper insert 46 and lower insert 48. A plurality of intermediate inserts 52, 54, and 56 extend between the upper insert 46 and lower insert 48, and in abutting relationship to the middle insert 50. When the set of inserts 35 is assembled, the design will be contained on each side thereof and the inserts are of a rectangular configuration.

in a game of the type disclosed it is desirable to permit the player or user to retain a set of pieces 35 in fixed relationship to each other after the assembly thereof has been accomplished. Towards this end coupling means 60 is provided as illustrated in FIG. 2. The coupling means 60 includes a pair of pins 62 having an elongated shaft 64 and head 65 at one end thereof. To receive the pin 62 each of the inserts may have an opening therein identified by numeral 66. The opening 66 extends vertically adjacent the edge of each piece such that they will be in axial alignment when the insert set 35 is properly assembled.

In order to facilitate the removal of the assembled set of pieces 35, a counter bore 68 is provided on the top side of insert 46, at both ends thereof. The counter bore 68 is of ample size to receive the head 65 of pin 62. Accordingly, by providing the openings or apertures 66 the set 35 may be easily assembled and slid out from the channel 24. If desired the set 35 may then be readily disassembled. Further, each end of a respective piece of the set 35 may contain the aperture 66 so as to confuse the player of the game and not indicate which is the inner end and which is the outer end of each piece.

Although an illustrative embodiment of the invention has been described in detail herein with reference to the accompanying drawings, it is to be understood that the invention is not limited to the precise embodiment, and that various changes and modifications may be effected therein without departing from the scope or spirit of the invention.

I claim:

1. A game for forming a variety of designs such as faces, scenes, etc., said game comprising:
   a. a frame having oppositely disposed outer ends with a vertically extending channel therebetween with an upper edge and lower edge and an opening extending transversely therethrough for viewing a design therein.
   b. a stand connected to said frame at the lower end thereof for vertically supporting same,
   c. said stand includes a leg at each end of said frame extending transversely thereto,
   d. a set of inserts having a rectangular configuration which when assembled in proper orientation to each other forms a single design thereon on each of the opposite sides thereof, said inserts being of a width to slide horizontally within said channel and between said upper and lower edges thereof and extending beyond said outer ends of said frame when assembled,
   e. said set of inserts includes:
      1. an upper insert and lower insert extending the width of said frame and beyond said outer ends,
      2. a middle insert extending between said upper and lower inserts, and
      3. a plurality of intermediate inserts extending between said upper and lower inserts in abutting relationship to said middle insert,
   f. means for coupling said assembled inserts in fixed position to each other when properly positioned in said frame, and
   g. said coupling means includes a vertically extending pin having a shaft and head at one end thereof, said pin adapted to be received adjacent each end of said inserts in aligned apertures for assembling same in fixed relationship to each other, the top insert having an aperture with a counterbore for receiving said head of said pin therein, and a plurality of apertures in said other inserts for receiving said shaft therein.

2. A game as in claim 1, wherein the design is of a human face.

* * * * *